US008983194B2

(12) United States Patent
Shibata

(10) Patent No.: US 8,983,194 B2
(45) Date of Patent: Mar. 17, 2015

(54) INFORMATION PROCESSING SYSTEM, INFORMATION PROCESSING METHOD, AND NON-TRANSITORY COMPUTER READABLE MEDIUM

(71) Applicant: Fuji Xerox Co., Ltd., Minato-ku, Tokyo (JP)

(72) Inventor: Yayoi Shibata, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 204 days.

(21) Appl. No.: 13/661,873

(22) Filed: Oct. 26, 2012

(65) Prior Publication Data

US 2013/0308865 A1 Nov. 21, 2013

(30) Foreign Application Priority Data

May 18, 2012 (JP) ................................ 2012-115087

(51) Int. Cl.
*G06K 9/46* (2006.01)
*G06K 9/66* (2006.01)
*G06F 17/30* (2006.01)

(52) U.S. Cl.
CPC .................................. *G06F 17/3028* (2013.01)
USPC .......................................................... 382/190

(58) Field of Classification Search
USPC ................................................. 382/181, 190
See application file for complete search history.

(56) References Cited

U.S. PATENT DOCUMENTS

| | | | | |
|---|---|---|---|---|
| 6,751,336 | B2 * | 6/2004 | Zhao | 382/100 |
| 7,643,705 | B1 * | 1/2010 | Erol et al. | 382/305 |
| 8,072,495 | B2 * | 12/2011 | Pai et al. | 348/207.1 |
| 2005/0135850 | A1 * | 6/2005 | Gombert | 399/341 |
| 2006/0149843 | A1 * | 7/2006 | Rhoads et al. | 709/227 |
| 2006/0245003 | A1 * | 11/2006 | Stumbo et al. | 358/402 |
| 2007/0133874 | A1 * | 6/2007 | Bressan et al. | 382/181 |
| 2009/0116687 | A1 * | 5/2009 | Rhoads et al. | 382/100 |
| 2009/0157572 | A1 * | 6/2009 | Chidlovskii | 706/12 |
| 2010/0150397 | A1 * | 6/2010 | Handley et al. | 382/100 |
| 2012/0050819 | A1 * | 3/2012 | Hong | 358/443 |

FOREIGN PATENT DOCUMENTS

JP 2002-259400 A 9/2002

* cited by examiner

*Primary Examiner* — John Strege
(74) *Attorney, Agent, or Firm* — Sughrue Mion, PLLC

(57) ABSTRACT

An information processing system includes a business-card described information acquiring unit and an association unit. The business-card described information acquiring unit acquires business-card described information that is to be extracted from an image in which a document identification image with which a document is identifiable and an image of a business card are arranged and that is at least part of information described on the business card. The association unit associates the document identified by the document identification image with the business-card described information.

12 Claims, 11 Drawing Sheets

FIG. 7

| DOCUMENT ID | BUSINESS-CARD OBJECT ID | |
|---|---|---|
| doc001 | nc001, nc002, nc003 | 60 |
| doc002 | nc004, nc008, nc009 | 60 |
| doc003 | nc012 | 60 |
| | | |

FIG. 8

| DIRECTORY ID | BUSINESS-CARD OBJECT ID | |
|---|---|---|
| dir 001 | nc001, nc002, | 62 |
| dir 002 | nc004, | 62 |
| dir 003 | nc012 nc008, nc009 | 62 |
| | | |

FIG. 10

| BUSINESS-CARD OBJECT ID | NAME INFORMATION | COMPANY NAME INFORMATION | TITLE INFORMATION | TELEPHONE NUMBER INFORMATION | ZIP CODE INFORMATION | ADDRESS INFORMATION | ELECTRONIC-MAIL ADDRESS INFORMATION | |
|---|---|---|---|---|---|---|---|---|
| nc001 | Smith... | ABC... | General manager | 03 -... | 123 -... | ..., New York State | smith@... | 64 |
| nc002 | Jones... | ABC... | Manager | 03 -... | 123 -... | ..., New York State | jones@... | 64 |
| | | | | | | | | |

FIG. 11

| COMMENT OBJECT ID | CREATION DATE INFORMATION | COMMENT INFORMATION | |
|---|---|---|---|
| c001 | 08 / 10 / 2011 | FLOW ... | 66 |
| c002 | 08 / 10 / 2011 | SYSTEM ... | 66 |
| | | | |

FIG. 12

| COMMENT OBJECT ID | DOCUMENT ID | |
|---|---|---|
| c001 | doc001 | 68 |
| c002 | doc001 | 68 |
| c003 | doc002 | 68 |
| c004 | doc002 | 68 |
| c005 | doc002 | 68 |
| | | |

| COMMENT OBJECT ID | BUSINESS-CARD OBJECT ID | |
|---|---|---|
| c001 | nc001 | 70 |
| c002 | nc002 | 70 |
| c003 | nc001 | 70 |
| c004 | nc004 | 70 |
| c005 | nc005 | 70 |

76

| | | | |
|---|---|---|---|
| Smith... | 08 / 10 / 2011 | Proposal | Flow... |
| Jones... | 08 / 10 / 2011 | Proposal | System... |
| Smith... | 08 / 15 / 2011 | Estimate | Unit price... |
| Davis... | 08 / 20 / 2011 | Estimate | Design... |
| Miller... | 08 / 25 / 2011 | Estimate | TEST... |

INFORMATION PROCESSING SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-115087 filed May 18, 2012.

BACKGROUND (i) Technical Field

The present invention relates to an information processing system, an information processing method, and a non-transitory computer readable medium.

(ii) Related Art

Technologies to utilize information described on business cards have been developed.

SUMMARY

According to an aspect of the invention, there is provided an information processing system including a business-card described information acquiring unit and an association unit. The business-card described information acquiring unit acquires business-card described information that is to be extracted from an image in which a document identification image with which a document is identifiable and an image of a business card are arranged and that is at least part of information described on the business card. The association unit associates the document identified by the document identification image with the business-card described information.

BRIEF DESCRIPTION OF THE DRAWINGS

Exemplary embodiments of the present invention will be described in detail based on the following figures, wherein:

FIG. 7 illustrates an example of document business-card associating information;

FIG. 8 illustrates an example of directory business-card associating information;

FIG. 10 illustrates an example of business-card object information;

FIG. 11 illustrates an example of comment object information;

FIG. 12 illustrates an example of comment document associating information;

DETAILED DESCRIPTION

Exemplary embodiments of the present invention will herein be described in detail with reference to the attached drawings.

Figure 1:
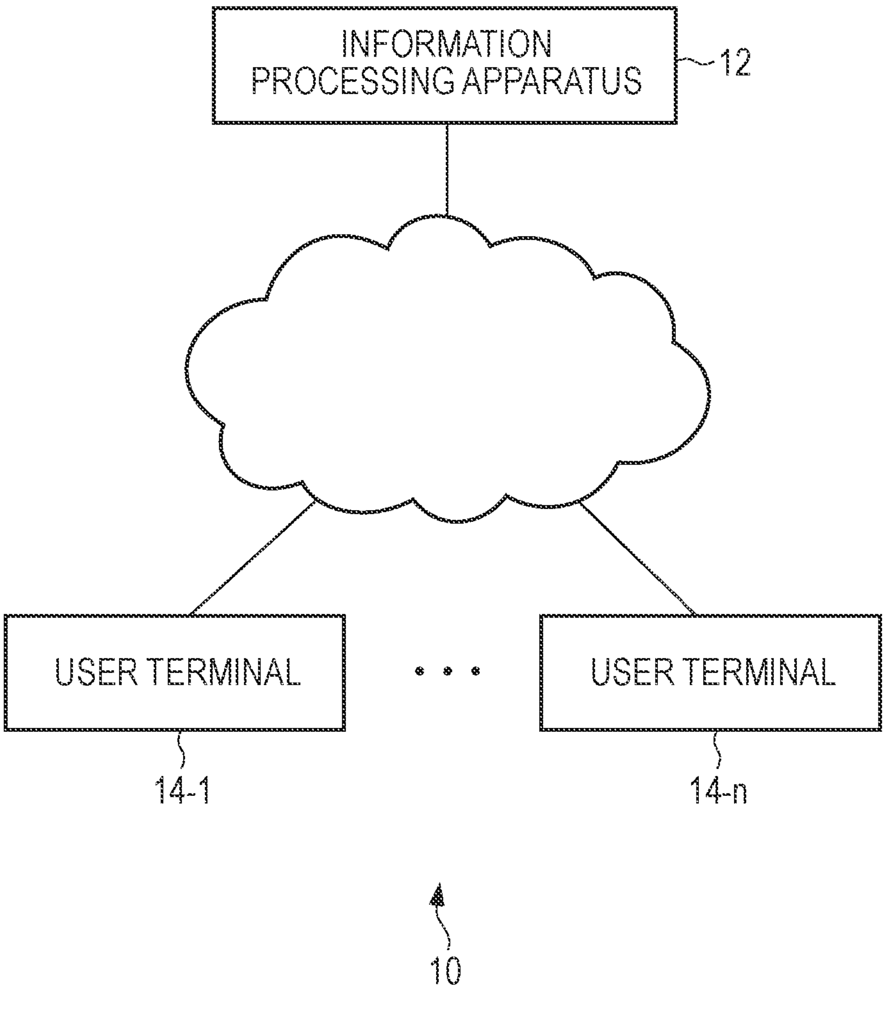
FIG. 1 illustrates an example of the configuration of an information processing system according to an exemplary embodiment of the invention.

FIG. 1 illustrates an example of the configuration of an information processing system 10 according to an exemplary embodiment of the invention. Referring to FIG. 1, the information processing system 10 according to the present exemplary embodiment includes, for example, an information processing apparatus 12 and user terminals 14-1 to 14-*n*. The user terminals 14-1 to 14-*n* are collectively referred to as a user terminal 14. The information processing apparatus 12 and the user terminal 14 are connected to a communication tool, such as a local area network (LAN) or the Internet, so as to be capable of communicating with each other.

The information processing apparatus 12 includes, for example, a controller, a memory, a communication unit, and a printer. The controller is a program control device, such as a central processing unit (CPU), which operates in accordance with programs installed in the information processing apparatus 12. The memory is, for example, a storage element, such as a read only memory (ROM) or a random access memory (RAM), or a hard disk drive. The communication unit is a communication interface, such as a network board. These elements are connected to each other via a bus. Programs executed by the controller in the information processing apparatus 12 are stored in the memory in the information processing apparatus 12. The memory in the information processing apparatus 12 also operates as a working memory for the information processing apparatus 12.

The user terminal 14 is a computer, such as a personal computer, a tablet terminal, a smartphone, or a mobile phone. The user terminal 14 includes, for example, a controller, a memory, a communication unit, a display, a speaker, a mouse, a keyboard, buttons, and a digital camera. The controller is a program control device, such as a CPU, which operates in accordance with programs installed in the user terminal 14. The memory is, for example, a storage element, such as a ROM or a RAM, or a hard disk drive. The communication unit is a communication interface, such as a network board.

Figure 2:
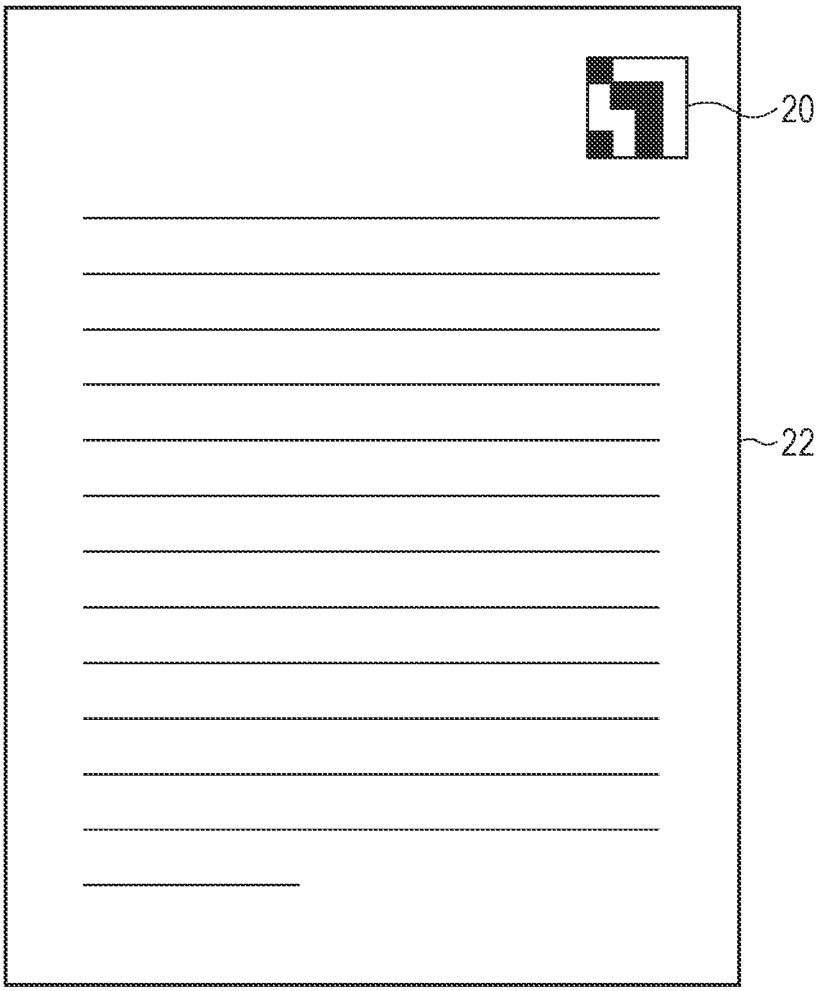
FIG. 2 illustrates an example of a print medium.

In the present exemplary embodiment, multiple directories and information about multiple documents (hereinafter referred to as "document information") are stored in the memory in the information processing apparatus 12. The multiple directories are associated with each other in advance so as to have a hierarchical structure of parent-child relationship. Each piece of the document information is associated with any directory. Identification information that identifies each document represented by the document information (hereinafter referred to as a "document ID") is associated with the document information stored in the memory in the information processing apparatus 12. In the present exemplary embodiment, in response to a request for the document information from a user, the information processing apparatus 12 prints a print medium 22 on which the content of the requested document information and a document identification image 20 corresponding to the document ID associated with the requested document information are formed (refer to FIG. 2). The document identification image 20 is, for example, a two-dimensional code (such as a QR code (registered trademark)) or a barcode in which a Uniform Resource Locator (URL) corresponding to a combination of the document ID associated with the document information and the information processing apparatus 12 is embedded. As described above, the document identification image 20 is an image with which a document is identifiable in the present exemplary embodiment. FIG. 2 illustrates an example of the print medium 22 on which the content of the document information and the document identification image 20 are formed.

The print medium 22 printed in the above manner is photographed by the digital camera in the user terminal 14 in a state in which a business card 24 is arranged on the print medium 22 or in a state in which a comment 26 or the like is written on the print medium 22 in the present exemplary embodiment. An image of the print medium 22 photographed by the digital camera is hereinafter referred to as a target image 28 (refer to FIGS. 3, 4, and 5).

Figure 3:
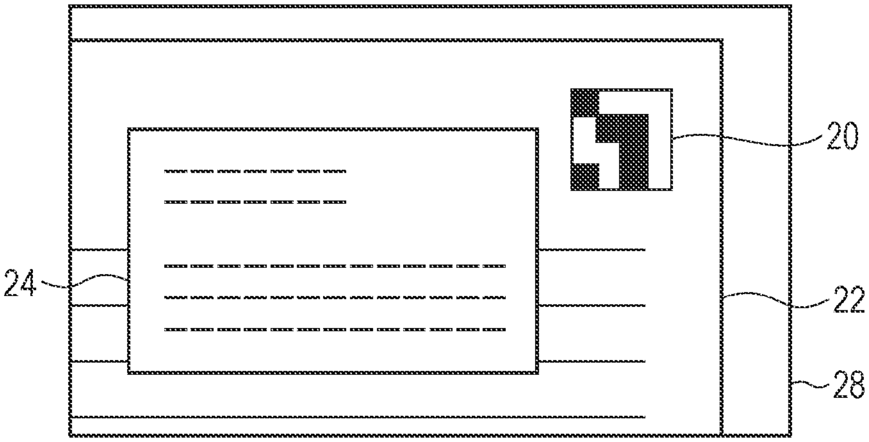
FIG. 3 illustrates an example of a target image.

FIG. 3 illustrates an example of the target image 28. The target image 28 in FIG. 3 includes an image of the business card 24 and an image of the print medium 22. The image of the print medium 22 includes the document identification image 20. In the present exemplary embodiment, a process described below is performed to store information in which the document identified by the document identification image 20 included in the target image 28 in FIG. 3 is associated with business-card described information, which is at least part of the information described on the business card 24 included in the target image 28 in FIG. 3, in the memory in the information processing apparatus 12.

Figure 4:
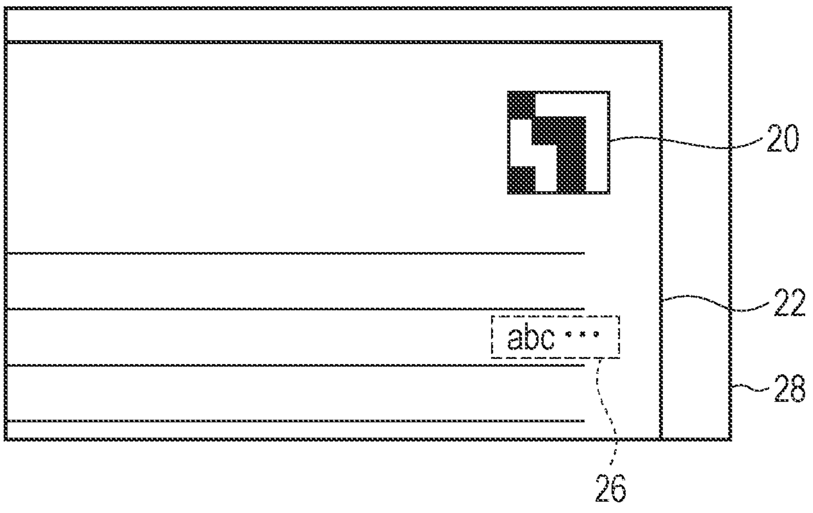
FIG. 4 illustrates another example of the target image.

FIG. 4 illustrates another example of the target image 28. The target image 28 in FIG. 4 includes an image of the print medium 22. The image of the print medium 22 includes the document identification image 20. Additional information to be added to the document (for example, the comment 26 in the present exemplary embodiment) is written on the print medium 22. In the present exemplary embodiment, the process described below is performed to store information in which the document identified by the document identification image 20 included in the target image 28 in FIG. 4 is associated with the comment 26 included in the target image 28 in FIG. 4 in the memory in the information processing apparatus 12.

Figure 5:
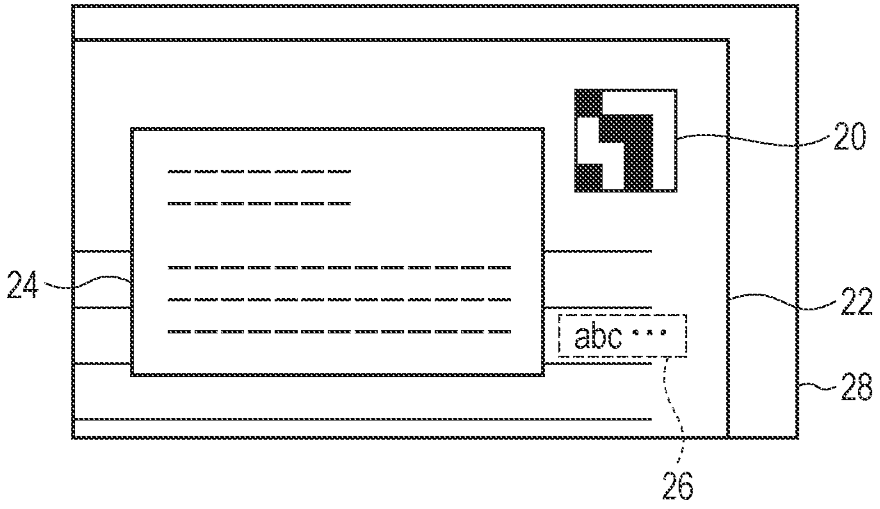
FIG. 5 illustrates another example of the target image.

FIG. 5 illustrates another example of the target image 28. The target image 28 in FIG. 5 includes an image of the business card 24 and an image of the print medium 22. The image of the print medium 22 includes the document identification image 20. The additional information to be added to the document (for example, the comment 26 in the present exemplary embodiment) is written on the print medium 22. In the present exemplary embodiment, the process described below is performed to store information in which the document identified by the document identification image 20 included in the target image 28 in FIG. 5, the comment 26 included in the target image 28 in FIG. 5, and the business-card described information, which is at least part of the information described on the business card 24 included in the target image 28 in FIG. 5, are associated with each other in the memory in the information processing apparatus 12.

The information processing apparatus 12 in the present exemplary embodiment has a function to identify the information described on the business card 24 and the comment 26 from the target image 28 by a known image processing technology and/or a known character recognition technology. For example, the information processing apparatus 12 may identify characters that are arranged in the target image 28 and that are handwritten as the comment 26 and may identify printed letters arranged in the target image 28 as the character string described on the business card 24. Alternatively, the information processing apparatus 12 may perform semantic analysis to multiple character strings arranged in the target image 28 on the basis of a dictionary stored in advance in the memory in the information processing apparatus 12 to identify the character string described on the business card 24 and the comment 26. In addition, a position where the business card 24 is to be arranged and a position where the comment 26 is to be arranged in the target image 28 may be set in advance. The information processing apparatus 12 may identify an area where the business card 24 is arranged and an area where the comment 26 is arranged on the basis of the above setting.

Figure 6:
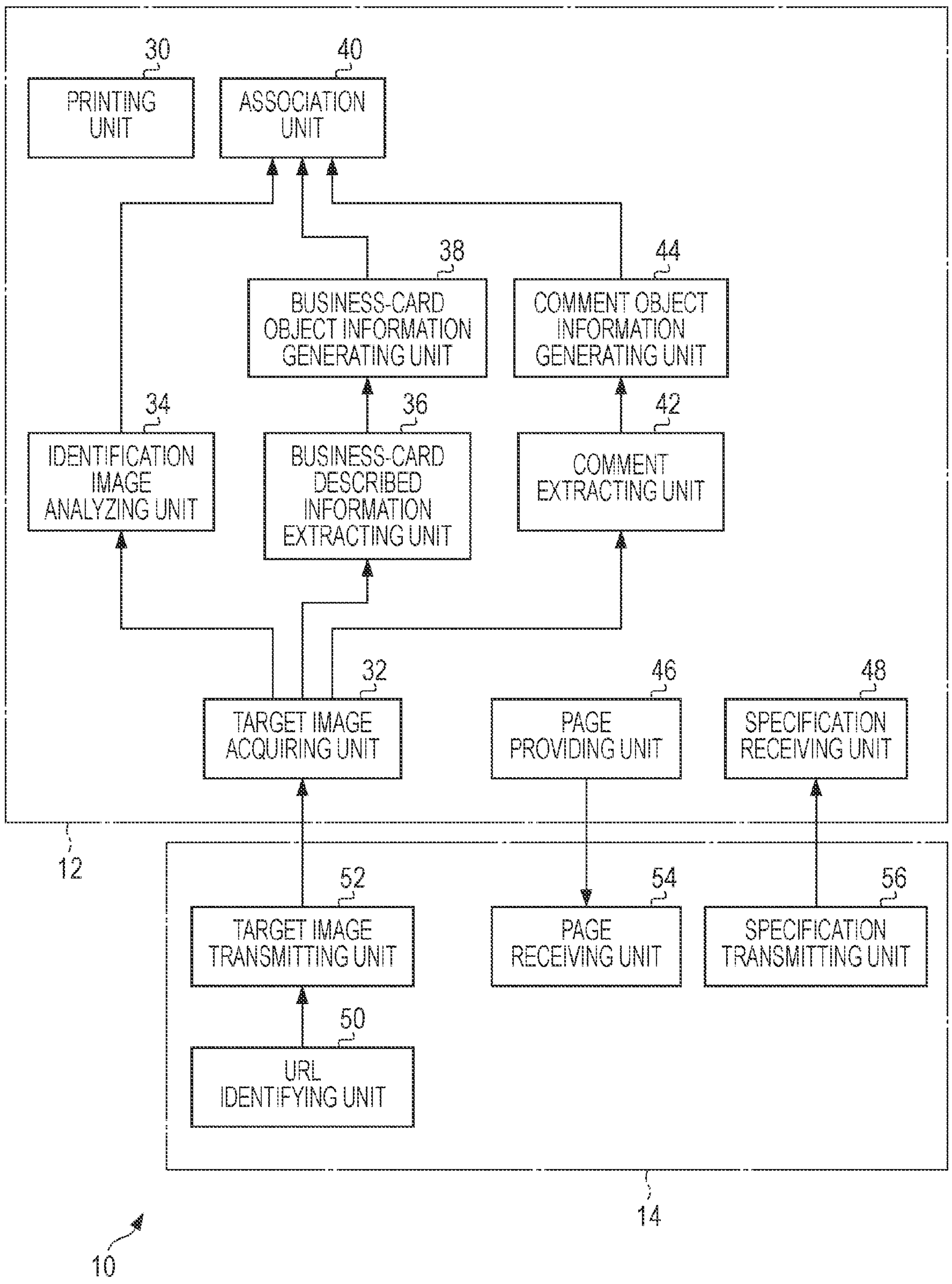
FIG. 6 is a functional block diagram illustrating exemplary functions realized by the information processing system according to the exemplary embodiment of the invention.

FIG. 6 is a functional block diagram illustrating exemplary major functions realized by the information processing system 10 according to the present exemplary embodiment. Referring to FIG. 6, the information processing apparatus 12 in the present exemplary embodiment functionally includes, for example, a printing unit 30, a target image acquiring unit 32, an identification image analyzing unit 34, a business-card described information extracting unit 36, a business-card object information generating unit 38, an association unit 40, a comment extracting unit 42, a comment object information generating unit 44, a page providing unit 46, and a specification receiving unit 48. These functions are realized by the controller in the information processing apparatus 12, which executes programs that are installed in the information processing apparatus 12, which is a computer, and that include instructions corresponding to the functions. The programs are supplied to the information processing apparatus 12 via a computer-readable recording medium, such as an optical disk, a magnetic disk, a magnetic tape, a magneto-optical disk, or a flash memory, or over a communication tool, such as the Internet.

The user terminal 14 in the present exemplary embodiment includes, for example, a URL identifying unit 50, a target image transmitting unit 52, a page receiving unit 54, and a specification transmitting unit 56. These functions are realized by the controller in the user terminal 14, which executes programs that are installed in the user terminal 14, which is a computer, and that include instructions corresponding to the functions. The programs are supplied to the user terminal 14 via a computer-readable recording medium, such as an optical disk, a magnetic disk, a magnetic tape, a magneto-optical disk, or a flash memory, or over a communication tool, such as the Internet.

In response to a request from the user terminal 14, the printing unit 30 in the information processing apparatus 12 prints the print medium 22 on which the content of the requested document information and the document identification image 20 corresponding to the document ID of the requested document are formed.

Upon photographing of the target image 28 by the digital camera in the user terminal 14, the URL identifying unit 50 in the user terminal 14 reads out the document identification image 20 included in the target image 28 to identify the URL corresponding to the document identification image 20. The target image transmitting unit 52 in the user terminal 14 transmits the target image 28 to an apparatus (the information processing apparatus 12 in the present exemplary embodiment) specified by the URL identified by the URL identifying unit 50.

In the present exemplary embodiment, document business-card associating information 60 illustrated in FIG. 7 and directory business-card associating information 62 illustrated in FIG. 8 are stored in advance in the memory in the information processing apparatus 12.

The document business-card associating information 60 is associated with each piece of the document information stored in the memory in the information processing apparatus 12. The document business-card associating information 60 includes the document ID and a business-card object ID described below. In an initial state, the value of the business-card object ID included in the document business-card associating information 60 is empty. As illustrated in FIG. 7, the document business-card associating information 60 may include multiple business-card object IDs.

The directory business-card associating information 62 is associated with each directory stored in the memory in the information processing apparatus 12. The directory business-card associating information 62 includes identification information about each directory (hereinafter referred to as a directory ID) and the business-card object ID described below. In the initial state, the value of the business-card object ID included in the directory business-card associating information 62 is empty. As illustrated in FIG. 8, the directory business-card associating information 62 may include multiple business-card object IDs.

Figure 9A:
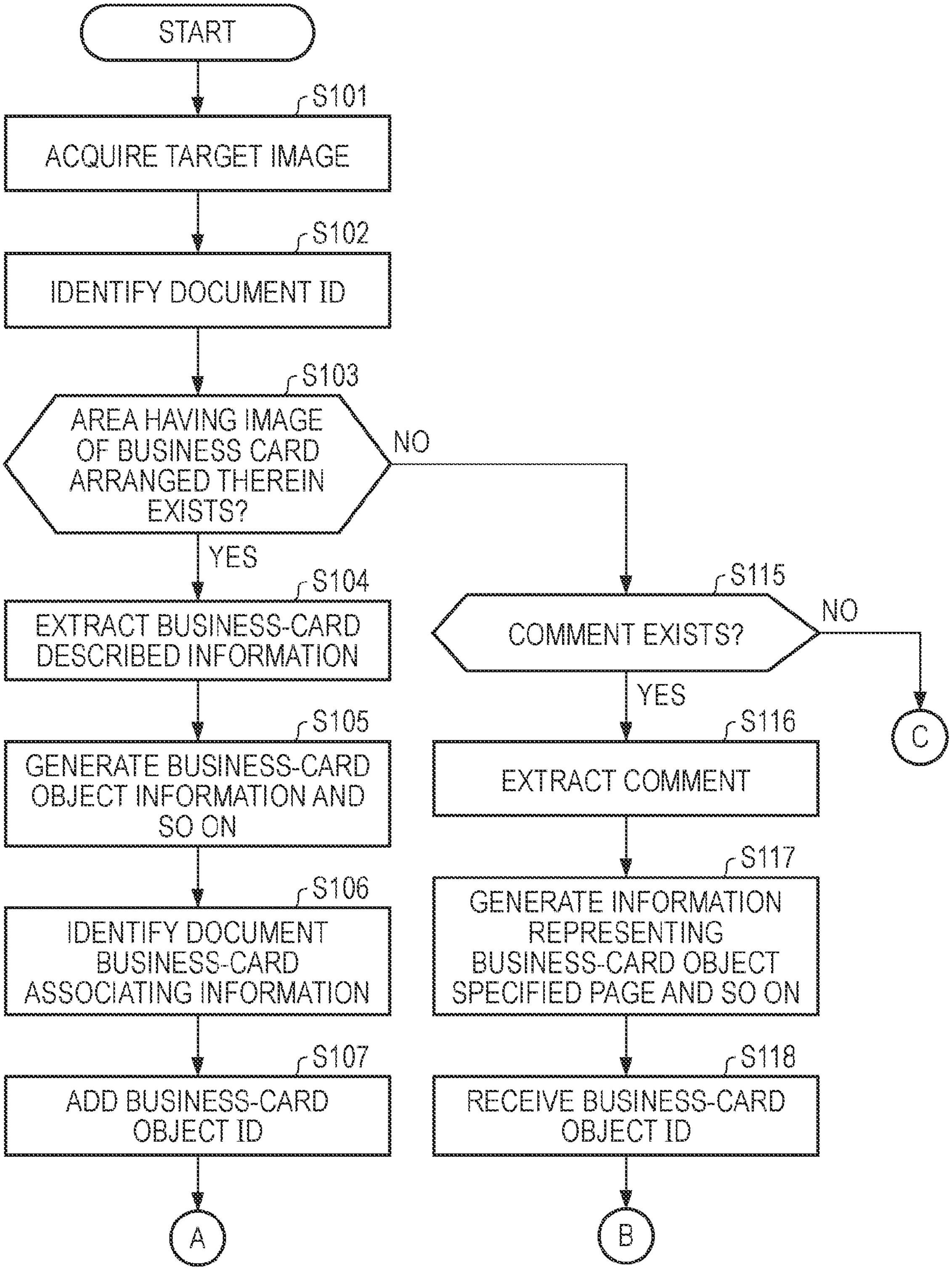
FIGS. 9A and 9B are flowcharts illustrating an example of a process performed by an information processing apparatus in the exemplary embodiment.
Figure 9B:
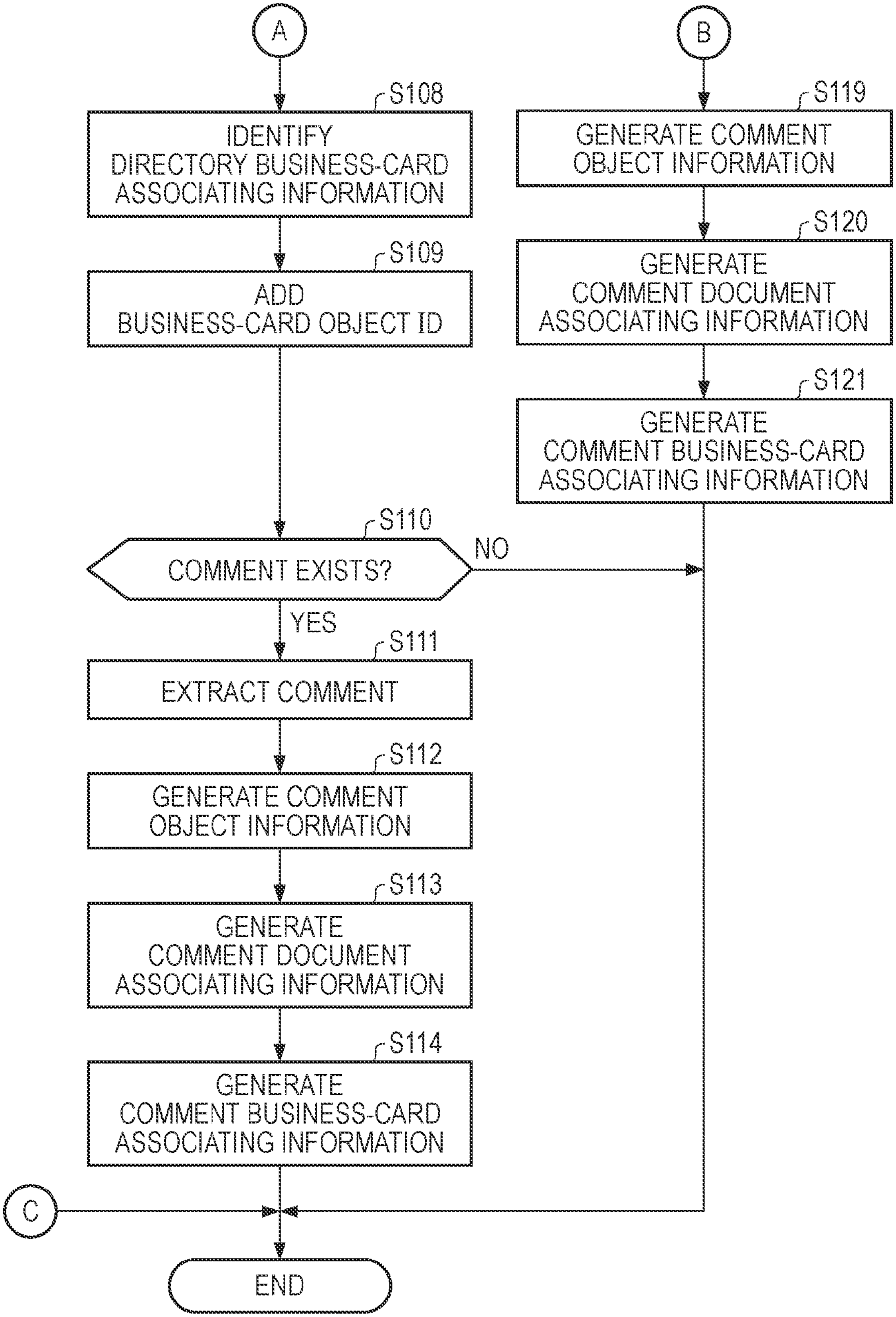

FIGS. 9A and 9B are flowcharts illustrating an example of a process from acquisition of the target image 28 from the user terminal 14 to association of the information, performed by the information processing apparatus 12 in the present exemplary embodiment.

Referring to FIG. 9A, in Step S101, the target image acquiring unit 32 acquires the target image 28 transmitted from the target image transmitting unit 52 in the user terminal 14. In Step S102, the identification image analyzing unit 34 reads out the document identification image 20 in the target image 28 acquired in Step S101 to identify the document ID corresponding to the document identification image 20.

In Step S103, the business-card described information extracting unit 36 confirms whether an area where an image of the business card 24 is arranged exists in the target image 28 acquired in Step S101 by using a known image processing technology.

If the business-card described information extracting unit 36 confirms that an area where an image of the business card 24 is arranged exists in the target image 28 (YES in Step S103), in Step S104, the business-card described information extracting unit 36 extracts the image in the area identified in Step S103 (that is, the image of the business card 24) from the target image 28 to extract the business-card described information, which is at least part of the information included in the extracted image of the business card 24, by using a known character recognition technology. In the present exemplary embodiment, for example, a name, a company name, a title, a telephone number, a zip code, an address, and an electronic-mail address are extracted as the business-card described information. In Step S105, the business-card object information generating unit 38 acquires the business-card described information extracted in Step S104 to generate business-card object information 64 illustrated in FIG. 10 on the basis of the business-card described information and associates the image of the business card 24 acquired in Step S104 with the generated business-card object information 64.

FIG. 10 illustrates an example of the business-card object information 64. As illustrated in FIG. 10, the business-card object information 64 includes, for example, the business-card object ID, which is the identification information for the business-card object information 64; name information representing a name specified as the business-card described information; company name information representing a company name specified as the business-card described information; title information representing a title specified as the business-card described information; telephone number information representing a telephone number specified as the business-card described information; zip code information representing a zip code specified as the business-card described information; address information representing an address specified as the business-card described information; and electronic-mail address information representing an electronic-mail address specified as the business-card described information. A new value that does not coincide with the business-card object IDs included in the business-card object information 64 that has been generated is set as the value of the business-card object ID included in the business-card object information 64 to be generated in Step S105.

In Step S106, the association unit 40 acquires the document ID identified in Step S102 to identify the document business-card associating information 60 including the document ID. In Step S107, the association unit 40 adds the business-card object ID included in the business-card object information 64 generated in Step S105 as the value of the business-card object ID included in the identified document business-card associating information 60.

Referring to FIG. 9B, in Step S108, the association unit 40 identifies the directory business-card associating information 62 including the directory IDs of directories corresponding to ancestors of the document information corresponding to the document ID identified in Step S102 (a first parent directory of the document information corresponding to the document ID identified in Step S102, a second parent directory of the first parent directory, a third parent directory of the second parent directory, . . . . ) In Step S109, the association unit 40 adds the business-card object ID included in the business-card object information 64 generated in Step S105 as the value of the business-card object ID included in the directory business-card associating information 62 identified in Step S108.

In Step S110, the comment extracting unit 42 confirms whether the comment 26 exists in the target image 28 acquired in Step S101 by using a known image processing technology. If the comment extracting unit 42 confirms that the comment 26 does not exist in the target image 28 (NO in Step S110), the process in FIGS. 9A and 9B is terminated.

If the comment extracting unit 42 confirms that the comment 26 exists in the target image 28 (YES in Step S110), in Step S111, the comment extracting unit 42 extracts the comment 26 arranged in the target image 28 by using a known character recognition technology. In Step S112, the comment object information generating unit 44 generates comment object information 66 illustrated in FIG. 11 on the basis of the comment 26 extracted in Step S111.

As illustrated in FIG. 11, the comment object information 66 includes, for example, a comment object ID, which is the identification information for the comment object information 66; creation date information indicating the date when the comment 26 is created; and comment information representing the content of the comment 26. For example, a date described in the comment 26 or a date when the comment 26 is acquired is set as the value of the creation date information about the comment 26. A new value that does not coincide with the comment object IDs included in the comment object information 66 that has been generated is set as the value of the comment object ID included in the comment object information 66 to be generated in Step S112.

In Step S113, the association unit 40 generates comment document associating information 68 illustrated in FIG. 12, which includes the comment object ID of the comment object information 66 generated in Step S112 and the document ID identified in Step S102.

Figures 13, 14:
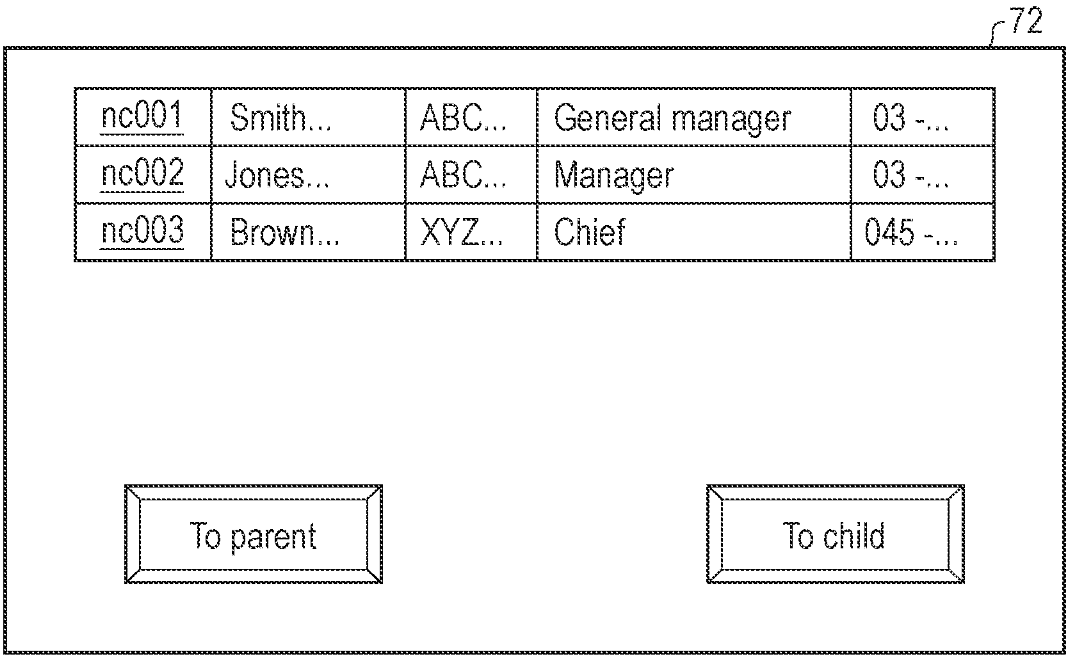
FIG. 13 illustrates an example of comment business-card associating information.
FIG. 14 illustrates an example of a business-card object specified page.

In Step S114, the association unit 40 generates comment business-card associating information 70 illustrated in FIG. 13, which includes the comment object ID of the comment object information 66 generated in Step S112 and the business-card object ID included in the business-card object information 64 generated in Step S105. Then, the process in FIGS. 9A and 9B is terminated.

Referring back to FIG. 9A, if the business-card described information extracting unit 36 confirms in Step S103 that an area where an image of the business card 24 is arranged does not exist in the target image 28 (NO in Step S103), in Step S115, the comment extracting unit 42 confirms whether the comment 26 exists in the target image 28 acquired in Step S101 by using a known image processing technology. If the comment extracting unit 42 confirms that the comment 26 does not exist in the target image 28 (NO in Step S115), the process in FIGS. 9A and 9B is terminated.

If the comment extracting unit 42 confirms that the comment 26 exists in the target image 28 (YES in Step S115), in Step S116, the comment extracting unit 42 extracts the comment 26 arranged in the target image 28 by using a known character recognition technology.

In Step S117, the page providing unit 46 generates information representing a business-card object specified page 72 illustrated in FIG. 14 and transmits the generated information to the user terminal 14. The page receiving unit 54 in the user terminal 14 receives the information, generates the business-card object specified page 72 illustrated in FIG. 14 on the basis of the received information, and displays the business-card object specified page 72 in the display.

As illustrated in FIG. 14, at least part of the elements included in the business-card object information 64 associated with the document information or the directory is arranged as a list in the business-card object specified page 72 in the present exemplary embodiment. Such elements are hereinafter referred to as "arranged elements." In the initial state, the arranged elements in the business-card object information 64 corresponding to the business-card object ID associated with the document ID identified in Step S102 in the document business-card associating information 60 are arranged as a list.

In the present exemplary embodiment, when the user clicks a button "To parent" arranged in the business-card object specified page 72, the user terminal 14 updates the business-card object specified page 72 so as to display the arranged elements in the business-card object information 64 associated with the directory corresponding to the parent of the document information or the directory associated with the arranged elements currently displayed in the business-card object specified page 72. When the user clicks a button "To child" arranged in the business-card object specified page 72 in a case in which the arranged elements in the business-card object information 64 associated with the directory are arranged in the business-card object specified page 72, the user terminal 14 updates the business-card object specified page 72 so as to display the arranged elements in the business-card object information 64 associated with the directory or the document information corresponding to the child of the directory associated with the arranged elements currently displayed in the business-card object specified page 72.

In the business-card object specified page 72 in the present exemplary embodiment, the business-card object IDs are arranged as links. When the user clicks the link corresponding to any of the business-card object ID, the specification transmitting unit 56 in the user terminal 14 transmits the business-card object ID to the information processing apparatus 12.

In Step S118 in FIG. 9A, the specification receiving unit 48 in the information processing apparatus 12 receives the business-card object ID from the user terminal 14.

Referring to FIG. 9B, in Step S119, the comment object information generating unit 44 generates the comment object information 66 including a new comment object ID, the creation date information indicating the date when the comment is created, and the comment information representing the content of the comment on the basis of the comment 26 extracted in Step S116, as in the Step S112.

In Step S120, the association unit 40 generates the comment document associating information 68 including the comment object ID of the comment object information 66 generated in Step S119 and the document ID identified in Step S102, as in Step S113.

In Step S121, the association unit 40 generates the comment business-card associating information 70 including the comment object ID of the comment object information 66 generated in Step S119 and the business-card object ID received in Step S118, as in Step S114. Then, the process in FIGS. 9A and 9B is terminated.

Figures 15, 16:
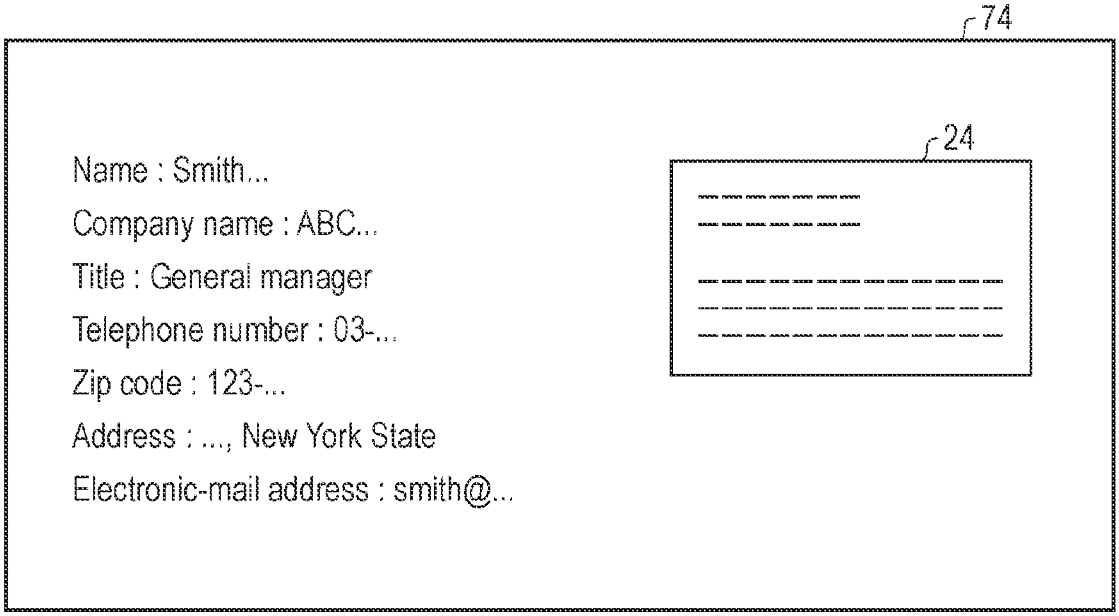
FIG. 15 illustrates an example of a business-card object property page.
FIG. 16 illustrates an example of a comment list page.

Upon reception of a transmission request for a business-card object property page 74 illustrated in FIG. 15 associated with the business-card object ID from the user terminal 14, the page providing unit 46 in the information processing apparatus 12 in the present exemplary embodiment transmits information representing the business-card object property page 74 corresponding to the business-card object ID associated with the received transmission request to the user terminal 14. Upon reception of the information, the page receiving unit 54 in the user terminal 14 generates the business-card object property page 74 on the basis of the received information and displays the business-card object property page 74 in the display.

The elements included in the business-card object information 64 including the business-card object ID which the information processing apparatus 12 has received from the user terminal 14 and an image of the business card 24 associated with the business-card object information 64 are arranged in the business-card object property page 74 illustrated FIG. 15.

Upon reception of a transmission request for a comment list page 76 illustrated in FIG. 16 associated with the directory ID or the document ID from the user terminal 14, the page providing unit 46 in the information processing apparatus 12 in the present exemplary embodiment transmits information representing the comment list page 76 corresponding to the directory ID or the document ID associated with the received transmission request to the user terminal 14.

In the transmission of the information representing the comment list page 76 to the user terminal 14, the page providing unit 46 identifies the document ID of the document information corresponding to a descendant of the directory identified by the directory ID associated with the transmission request received from the user terminal 14 or the document ID associated with the transmission request received from the user terminal 14. Then, the page providing unit 46 identifies the comment object ID associated with the identified document ID in the comment document associating information 68.

The page providing unit 46 transmits information corresponding to the comment list page 76 to the user terminal 14 for every comment object ID identified in the above manner. The information corresponding to the comment list page 76 includes (1) the name information corresponding to the business-card object ID associated with the comment object ID identified in the comment business-card associating information 70, (2) the creation date information associated with the identified comment object ID in the comment object information 66, (3) the name of the document identified by the document ID associated with the identified comment object ID in the comment document associating information 68, and (4) the comment information associated with the identified comment object ID in the comment object information 66. Upon reception of the information, the page receiving unit 54 in the user terminal 14 generates the comment list page 76 on the basis of the received information and displays the comment list page 76 in the display.

Upon reception of specification of the document ID of the document information stored in the information processing apparatus 12 and the business-card object ID included in the business-card object information 64 associated with the document information or the directory corresponding to an ancestor of the document information from the user terminal 14, the information processing apparatus 12 in the present exemplary embodiment generates the document business-card associating information 60 including the document ID and the business-card object ID and stores the document business-card associating information 60 in the memory.

The present invention is not limited to the above exemplary embodiments.

For example, the user terminal 14 may transmit the target image 28 to the information processing apparatus 12 in association with the URL identified by the URL identifying unit 50 in the user terminal 14. In this case, the information processing apparatus 12 may identify the document ID on the basis of the URL received from the user terminal 14, instead of the analysis of the document identification image 20 in the target image 28.

The role sharing between the information processing apparatus 12 and the user terminal 14 is not limited to the above examples. For example, the user terminal 14 may extract the business-card described information from the target image 28 to transmit the extracted business-card described information to the information processing apparatus 12. The information processing apparatus 12 may generate the business-card object information 64 on the basis of the received business-card described information. Alternatively, for example, the user terminal 14 extracts the comment 26 from the target image 28 to transmit the extracted comment 26 to the information processing apparatus 12. The information processing apparatus 12 may generate the comment object information 66 on the basis of the received comment 26. Alternatively, for example, the user terminal 14 may analyze the document identification image 20 included in the target image 28 to identify the document ID. The user terminal 14 may transmit the document ID to the information processing apparatus 12. The information processing apparatus 12 may receive the document ID. The information processing apparatus 12 may perform, for example, addition of the business-card object ID to the document business-card associating information 60 or the directory business-card associating information 62, generation of the comment document associating information 68, generation of the comment business-card associating information 70, etc. on the basis of the received document ID.

In addition to the document ID associated with the document information that is requested, the identification information (user ID) about the user associated with the document information, the identification information (organization ID) about an organization to which the user associated with the document information belongs, etc. may be embedded in the document identification image 20 formed on the print medium 22 to be printed by the information processing apparatus 12. The user associated with the document information is, for example, a person involved in the document, such as the user who submits the request. The organization to which the user associated with the document information belongs is, for example, an organization to which the person involved in the document belongs, such as the organization to which the user submitting the request belongs. In other words, the document identification image 20 may be an image with which a combination of a document and the user associated with the document is identifiable, may be an image with which a combination of a document and the organization to which the user associated with the document belongs is identifiable, or may be an image with which a combination of a document, the user associated with the document, and the organization to which the user associated with the document belongs is identifiable.

The information processing apparatus 12 may generate information in which the comment 26 included in the target image 28 received from the user terminal 14 or the business-card described information identified on the basis of the target image 28 is associated with the user ID or the organization ID embedded in the document identification image 20 included in the target image 28 and may store the generated information in the memory.

The information processing apparatus 12 in the present exemplary embodiment may be composed of multiple units of housing. The specific character strings and the numerical values described above and the specific character strings and the numerical values in the drawings are only examples and are not limitedly used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:

a business-card information acquiring unit configured to acquire business-card information from an image in which a document identification image and an image of a business card are arranged, the document identification image being separate from the image of the business card; and an association unit configured to associate the document identified by the document identification image with the business-card information.

2. The information processing system according to claim 1, further comprising:

an additional information acquiring unit configured to acquire additional information from an additional information image arranged in the image, wherein the association unit is further configured to associate the document identified by the document identification image with the additional information.

3. The information processing system according to claim 2, further comprising:

a specification receiving unit configured to receive a specification of the business-card information associated with another document associated with the document identified by the document identification image, wherein the association unit is further configured to associate the document identified by the document identification image, the additional information, and the business-card information with the other document.

4. The information processing system according to claim 1, wherein the document identification image identifies a combination of a document and a user associated with the document, and wherein the association unit is further configured to associate the document identified by the document identification image and the business-card information acquired by the business-card information acquiring unit with the user associated with the document.

5. The information processing system according to claim 1, further comprising:

a target image acquiring unit configured to acquire a target image; and a business-card information extracting unit configured to extract the business-card information from the target image, wherein the business-card information acquiring unit is further configured to acquire the business-card information extracted by the business-card information extracting unit.

6. An information processing method comprising:

acquiring business-card information from an image in which a document identification image and an image of a business card are arranged, the document identification image being separate from the image of the business card; and associating the document identified by the document identification image with the business-card information.

7. A non-transitory computer readable medium storing a program causing a computer to execute a process comprising:

acquiring business-card information from an image in which a document identification image and an image of a business card are arranged, the document identification image being separate from the image of the business card; and associating the document identified by the document identification image with the business-card information.

8. The information processing system according to claim 1, further comprising:

a storage configured to store association information corresponding to the association between the document identified by the document identification image and the business-card information.

9. The information processing system according to claim 8, further comprising:

a controller configured to control to retrieve, from the storage, the association information in response to a request for the association information.

10. The information processing system according to claim 9, further comprising:

a display configured to display at least one of a portion of the document identified by the document identification image and a portion of the business card information based on the retrieved association information.

11. An information processing system comprising:

a storage configured to store an electronic document;

a business-card information acquiring unit configured to acquire business-card information from an image in which a document identification image and an image of a business card are arranged, the document identification image includes information which identifies the electronic document; and an association unit configured to associate the document with the business-card information.

12. The information processing system according to claim 11, wherein the storage is further configured to store information on a folder which is associated with the electronic document; and wherein the association unit is further configured to associate the business-card information with the folder.

* * * * *